United States Patent
Gupta et al.

(10) Patent No.: US 11,042,678 B2
(45) Date of Patent: Jun. 22, 2021

(54) CLOCK GATE LATENCY MODELING BASED ON ANALYTICAL FRAMEWORKS

(71) Applicant: Samsung Electronics Co., Ltd., Suwon-si (KR)

(72) Inventors: Naman Gupta, Austin, TX (US); Vinayak Kini, Austin, TX (US); Hongda Lu, Austin, TX (US)

(73) Assignee: SAMSUNG ELECTRONICS CO., LTD.

(*) Notice: Subject to any disclaimer, the term of this patent is extended or adjusted under 35 U.S.C. 154(b) by 0 days.

(21) Appl. No.: 16/664,792

(22) Filed: Oct. 25, 2019

(65) Prior Publication Data
US 2020/0401669 A1  Dec. 24, 2020

Related U.S. Application Data

(60) Provisional application No. 62/863,860, filed on Jun. 19, 2019.

(51) Int. Cl.
| | | |
|---|---|---|
| *G06F 30/327* | (2020.01) | |
| *G06K 9/62* | (2006.01) | |
| *G06N 3/04* | (2006.01) | |
| *G06F 1/10* | (2006.01) | |
| *G06F 30/39* | (2020.01) | |
| *G06F 30/396* | (2020.01) | |

(52) U.S. Cl.
CPC ............ *G06F 30/327* (2020.01); *G06F 1/10* (2013.01); *G06F 30/39* (2020.01); *G06K 9/6256* (2013.01); *G06N 3/04* (2013.01); *G06F 30/396* (2020.01)

(58) Field of Classification Search
USPC ........................................................ 716/104
See application file for complete search history.

(56) References Cited

U.S. PATENT DOCUMENTS

| | | | |
|---|---|---|---|
| 8,869,091 | B2 | 10/2014 | Dhar et al. |
| 9,058,451 | B2 | 6/2015 | Lin et al. |
| 9,183,335 | B2 | 11/2015 | Ma et al. |
| 9,607,122 | B2 | 3/2017 | Le Bars |
| 2003/0009733 | A1* | 1/2003 | Hathaway ............ G06F 30/3312 716/108 |

(Continued)

FOREIGN PATENT DOCUMENTS

KR     20040046284 A     6/2004

*Primary Examiner* — Mohammed Alam
(74) *Attorney, Agent, or Firm* — Renaissance IP Law Group LLP

(57) ABSTRACT

A method for modeling clock gate timing for an integrated circuit may include creating a dataset having measured values of at least two design features and corresponding measured values of clock gate timing, applying an analytical framework to the dataset to determine how the design features affect the clock gate timing, measuring values of design features for a clock tree for the integrated circuit, and generating predicted values of clock gate timing for the clock tree for the integrated circuit based on how the design features of the dataset affect the clock gate timing of the dataset. The clock tree for the integrated circuit may be a second clock tree, and creating the dataset may include constructing a first clock tree, measuring values of design features of the first clock tree, and measuring corresponding values of clock gate timing of the first clock tree.

18 Claims, 13 Drawing Sheets

(56) References Cited

U.S. PATENT DOCUMENTS

| | | | | |
|---|---|---|---|---|
| 2005/0198601 | A1* | 9/2005 | Kuang | G06F 30/33 |
| | | | | 716/108 |
| 2008/0276209 | A1 | 11/2008 | Albrecht et al. | |
| 2008/0301593 | A1* | 12/2008 | Jiang | G06F 30/3312 |
| | | | | 716/132 |
| 2008/0301594 | A1* | 12/2008 | Jiang | G06F 30/3312 |
| | | | | 716/134 |
| 2010/0231282 | A1* | 9/2010 | Singasani | G06F 30/327 |
| | | | | 327/297 |
| 2012/0047478 | A1 | 2/2012 | Ge et al. | |
| 2019/0325092 | A1* | 10/2019 | Ren | G06N 3/08 |
| 2020/0073433 | A1* | 3/2020 | Aune | G06F 1/10 |

* cited by examiner

Training Process

Prediction Process

| Clock Gate | Feature 1 | Feature 2 | Feature 3 | Feature 4 | Feature 5 | Latency (ps) |
|---|---|---|---|---|---|---|
| #1 | 190 | 2219.373 | 1 | 283.98 | 186.3 | 390 |
| #2 | 20 | 6.295392 | 2 | 190.74 | 180.87 | 480 |
| #3 | 5700 | 3000.072 | 1 | 193.02 | 189.48 | 480 |
| #4 | 18 | 8.52698 | 2 | 188.34 | 206.04 | 480 |
| #5 | 2520 | 2054.4581 | 1 | 189.06 | 195.3 | 480 |
| #6 | 34 | 5.494832 | 2 | 187.5 | 212.4 | 480 |
| #7 | 287 | 4.608752 | 2 | 188.34 | 217.08 | 480 |
| #8 | 32 | 3.03728 | 2 | 185.7 | 212.34 | 480 |
| #9 | 43 | 2.909608 | 2 | 190.14 | 200.34 | 480 |
| #10 | 126 | 5.819072 | 2 | 188.88 | 177.9 | 480 |

FIG. 10

CLOCK GATE LATENCY MODELING BASED ON ANALYTICAL FRAMEWORKS

CROSS-REFERENCE TO RELATED APPLICATION

This application claims priority to, and the benefit of, U.S. Provisional Patent Application Ser. No. 62/863,860 titled "An Analytical Framework To Model Clock Gate Latencies Prior To Clock Tree Synthesis" filed Jun. 19, 2019 which is incorporated by reference.

BACKGROUND

1. Field

This disclosure relates generally to modeling clock gate timing for integrated circuits, and more specifically to methods and apparatus for generating timing predictions based on training datasets obtained from clock tree builds.

2. Related Art

Clock trees are used to distribute clock signals throughout integrated circuits (ICs) to synchronize the operation of various subsystems and components throughout the IC. Clock trees are designed through a balancing process that seeks to minimize latency, which is the delay from a clock source to a point of usage, and skew, which is the difference between the arrival time of a clock transition at different points on the integrated circuit. During the design process, many parameters of a clock tree are typically adjusted through multiple iterations to meet the timing requirements and constraints for the clock tree. When the goals for the timing requirements and constraints have been satisfied, the design is said to have achieved timing closure.

Clock trees typically consume a significant percentage of the area and power budget of an integrated circuit. For example, a clock tree may consume as much as 30 to 40 percent of the total chip power. To reduce the amount of power consumed by the clock tree in an integrated circuit, a technique known as clock gating may be used. Clock gating disables portions of clock trees as well as the synchronous logic elements that are clocked or controlled by those portions of the clock tree.

SUMMARY

A method for modeling clock gate timing for an integrated circuit may include creating a dataset having measured values of at least two design features and corresponding measured values of clock gate timing, applying an analytical framework to the dataset to determine how the design features affect the clock gate timing, measuring values of design features for a clock tree for the integrated circuit, and generating predicted values of clock gate timing for the clock tree for the integrated circuit based on how the design features of the dataset affect the clock gate timing of the dataset. The clock tree for the integrated circuit may be a second clock tree and part of a second build, and creating the dataset may include constructing a first clock tree as part of a first build, measuring values of design features of the frst clock tree, and measuring corresponding values of clock gate timing of the first clock tree.

The values of the design features and clock gate timing may be measured after a physical synthesis of the first clock tree. The method may include applying the predicted values of clock gate timing to a model of the second clock tree. The predicted values of clock gate timing may be applied to the model of the second clock tree before a physical synthesis of the second clock tree. Applying an analytical framework to the dataset may include determining coefficients based on how the design features affect the clock gate timing. The coefficients may be determined for individual design features. The coefficients may be determined for combinations of design features. Different combinations of design features may be used for different builds. Coefficients may be determined for different permutations of the combinations of features. Different permutations of design features may be used for different builds. The analytical framework may include machine learning. The machine learning may use a neural network. The neural network may be trained on the dataset. The analytical framework may include heuristics. The values of clock gate timing may include latency values. The clock tree for the integrated circuit may include clock gate enable paths. The design features may include one or more of: a logic level of the clock gate, a bounding box area of a transitive fan-out of the clock gate, a distance of the clock gate from a clock source, and a distance from the clock gate to a mid-point of a bounding box of a transitive fan-out of the clock gate. The method may include applying one or more adjustments to the analytical framework. The one or more adjustments may include one or more of: a process technology for a clock gate, standard cell libraries used in a clock gate or clock tree, placement of a clock gate, routing of a clock gate, a tool used to design the clock tree for the integrated circuit, a methodology used to analyze the clock tree for the integrated circuit, a constraint for the clock tree for the integrated circuit, and the number of clock sources for a multi-source clock tree.

A method for clock gate modeling for an integrated circuit may include constructing a first clock tree as part of a first build, generating a first dataset by measuring values of design features of the first clock tree, and measuring corresponding values of clock gate timing of the clock gates of the first clock tree, and applying an analytical framework to the dataset to generate coefficients. The method may include iteratively applying the analytical framework to the first dataset to generate the coefficients. The method may include constructing additional clock trees as part of additional builds, generating additional datasets by measuring values of design features of the additional clock trees, and measuring corresponding values of clock gate timing of the clock gates of the additional clock trees, and applying the analytical framework to the additional dataset to generate the coefficients. The method may include iteratively applying the analytical framework to the additional datasets to generate the coefficients. The values of the design features and clock gate timing may be measured after a physical synthesis of the first clock tree. The method may include measuring values of design features for a clock tree for the integrated circuit, and generating predicted values of clock gate timing for the clock tree for the integrated circuit based on the coefficients and measured values of one or more of the same design features used to generate the coefficients. The analytical framework may implement machine learning.

A system for modeling clock gate timing for an integrated circuit may include an analytical platform configured to apply an analytical framework to a dataset having measured values of at least two design features and corresponding measured values of clock gate timing for a first clock tree build, wherein the analytical framework generates coefficients based on how the design features affect the clock gate timing, and generate predicted values of clock gate timing for a second clock tree build based on the coefficients and measured values of one or more of the same design features used to generate the coefficients. The system may include a user interface configured to select combinations of the design features. The user interface may be further configured to select permutations of the combinations of the design features. The analytical platform may be configured to provide the predicted values of clock gate timing to a clock tree construction workflow of an EDA platform.

BRIEF DESCRIPTION OF THE DRAWINGS

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims. The accompanying drawings, together with the specification, illustrate example embodiments of the present disclosure, and, together with the description, serve to explain the principles of the present disclosure.

FIG. 10 illustrates a dataset showing example values of measured design features and corresponding measured values of clock gate latencies according to this disclosure.

DETAILED DESCRIPTION

Figure 1:
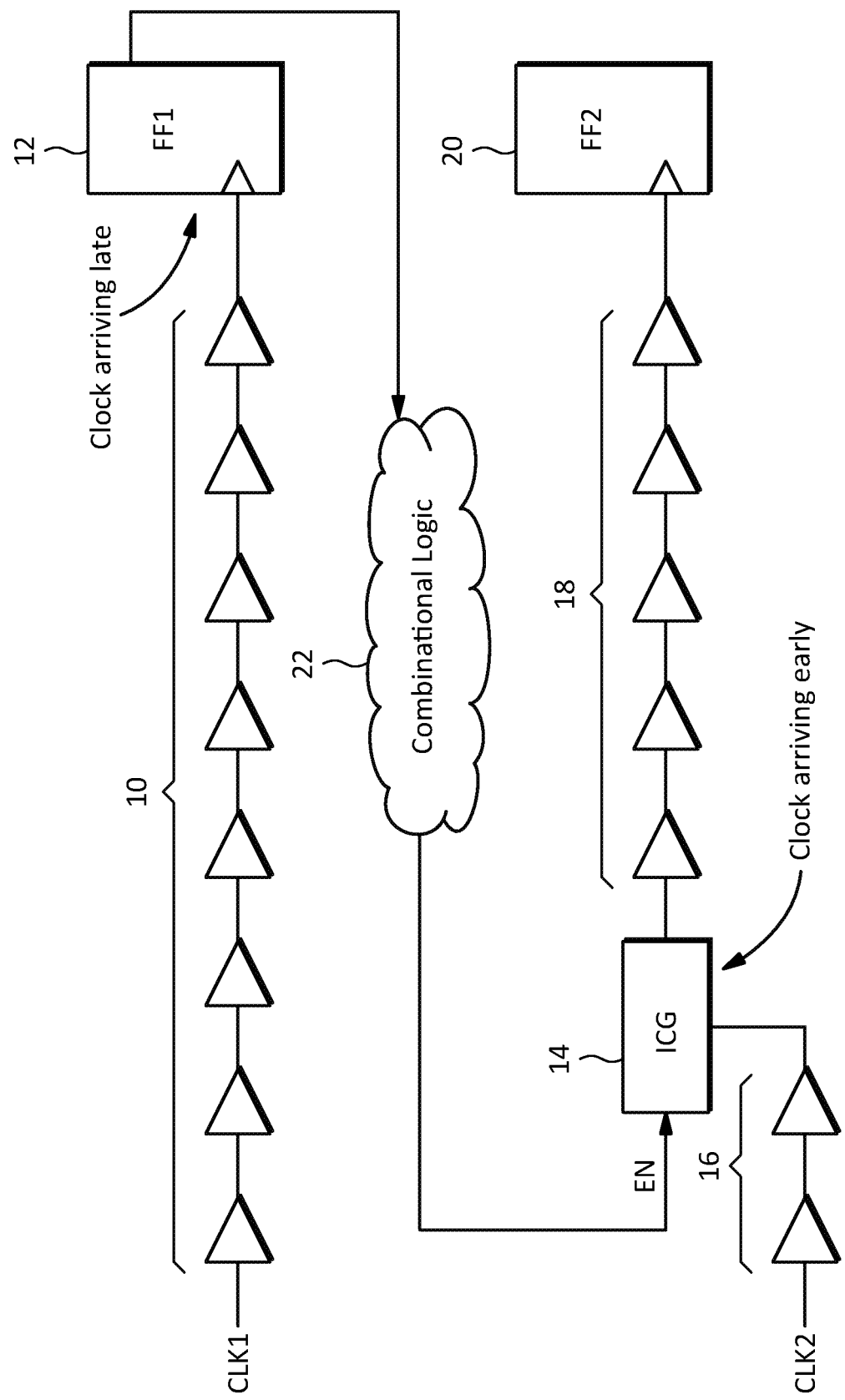
FIG. 1 is a circuit diagram of a portion of a conventional clock tree which may illustrate timing problems associated with an integrated clock gate.

Clock gating is typically implemented by using clock gate circuits called integrated clock gates (ICGs) to disable portions of clock trees and the synchronous logic circuit they control. FIG. 1 illustrates a portion of a clock tree having a first branch with a string of buffers 10 that clocks a synchronous circuit element shown as a flip-flop 12 (FF1) in response to a first clock signal CLK1. A second branch of the clock tree has an integrated clock gate (ICG) 14 interposed between a first string of clock buffers 16 and a second string of clock buffers 18. The second branch clocks a synchronous circuit element shown as a flip-flop 20 (FF2) in response to a second clock signal CLK2. The first and second clock signals CLK1 and CLK2 may be derived from a common source clock, either directly or through other branches, and may be considered to be effectively synchronized for purposes of FIG. 1.

As mentioned above, clock trees may be designed through a balancing process that seeks to equalize the latency through each branch of a clock tree so that a transition in the clock signal arrives at essentially the same time at each synchronous circuit element that is synchronized by the clock. It may be relatively straightforward to converge or balance the clock timing at ordinary synchronous logic elements such as FF1 and FF2 which are at locations that may only need to be clocked at the same time as most other synchronous logic elements, that is, at the end of a whole clock cycle, i.e., normal clock edges. Integrated circuits are typically designed on electronic design automation (EDA) platforms that include various tools for timing analysis, clock tree synthesis (CTS) and many other functions that are adept at constructing and synchronizing clock signals to ordinary logic elements such as FF1 and FF2.

The timing of the integrated clock gate 14, however, may be more difficult to converge because it may need to be clocked at a time that occurs between normal clock edges. For example, in FIG. 1, the integrated clock gate 14 is controlled by an enable signal EN which originates at the output of FF1 on an ordinary clock edge, may propagate through combinational logic 22 to arrive at the enable input of the integrated clock gate 14 at a time that may be between normal clock edges. Moreover, due to the location of the integrated clock gate 14 at a position relatively close to the clock signal CLK2 in the second branch, the clock signal may arrive at the integrated clock gate 14 significantly earlier than the clock signal arriving at FF1 which may need to propagate all the way through the first branch which may include the entire string of buffers 10. Thus, clock gate enable setup timing may be difficult to converge. This may be especially true for single point CTS and multi-source CTS (MSCTS) where clock latencies may be quite large. The tools available in EDA platforms may not be able handle these difficulties effectively. These problems may be exacerbated by the lack of accurate modeling tools for clock tree latencies.

One conventional technique for modeling clock gate latency involves the use of simple look-up tables based on bracketed ICG transitive fan-outs. For example, a lookup table may specify an applied latency of 0.92 nanoseconds (ns) for clock gates having an endpoint fan-out of 1-49, an applied latency of 0.82 ns for a fan-out of 50-99, an applied latency of 0.72 ns for a fan-out of 100-499, an applied latency of 0.65 ns for a fan-out of 500-1999, an applied latency of 0.58 ns for a fan-out of 2000-9999, an applied latency of 0.46 ns for a fan-out of 10000-19999, and an applied latency of 0.4 ns for any fan-out of 20000 or greater. These numbers, however, may either be overly optimistic or pessimistic in most case and rarely, if ever very accurate.

Other conventional tools and techniques for fixing clock gate enable path timing may require multiple iterations during engineering change order (ECO) mode, which may be late in the typical physical design flow and therefore may have a negative impact on design completion.

Another technique involves cloning clock gates which may push them further down the clock tree so they are closer to the ordinary logic cells and therefore have less severe latency timing problems that are easier to converge. This technique, however, may cause the enable timing to become even more critical. Moreover, the cloned clock gate cells may consume more power and chip area and lead to greater routing congestion.

Another technique involves the use of trial CTS runs to estimate the clock gate latencies. This technique, however, may require more run-time which may have a negative impact on design completion.

With existing modeling techniques it may not be possible to attempt to converge clock gate enable timing paths until after CTS, at which point the scope of available logic restructuring may be limited, clock paths may have become immutable, and it may be too late to converge clock gate enable timing paths. Thus, having the ability to model clock gate latencies more accurately may enable a clock designer to identify critical clock gate enable paths earlier, for example, as early as first physical synthesis, when optimization tools in EDA platforms may be better able to optimize clock gate paths through logic restructuring and other techniques.

Figure 2:
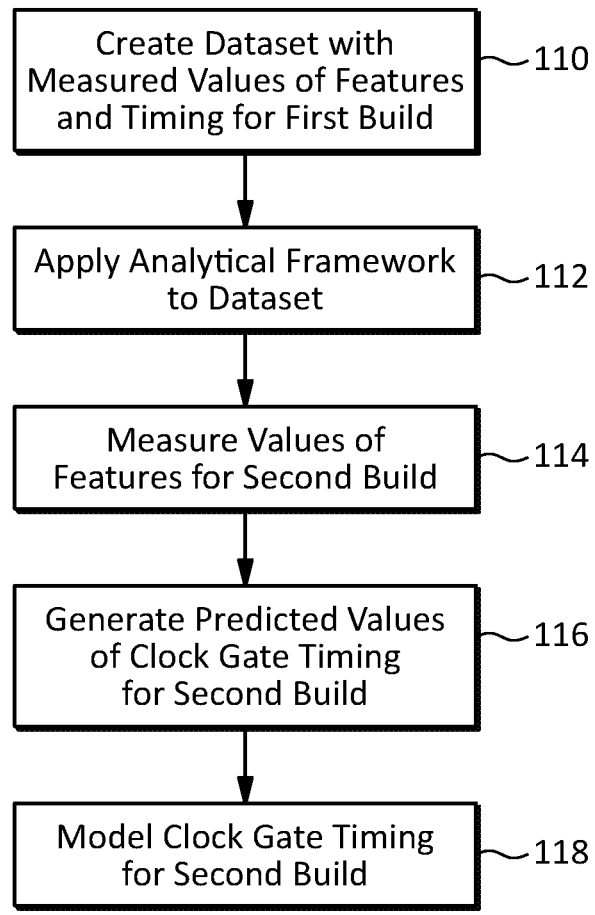
FIG. 2 is a flowchart illustrating an embodiment of a method for modeling clock gate timing for an integrated circuit according to the principles of this disclosure.

FIG. 2 is a flowchart illustrating an embodiment of a method for modeling clock gate timing for an integrated circuit according to the principles of this disclosure. The method begins at process 110 by creating a dataset having measured values of at least two design features and corresponding measured values of clock gate timing for a first clock tree build. Examples of possible design features include any electrical, physical or timing feature such as the logic level of the clock gate, transitive fanout, bounding box area of the transitive fanout, distance from the nearest clock distribution endpoint, and distance from the clock gate to the midpoint of the bounding box. The clock gate timing may be, for example, a latency for an integrated clock gate. At process 112, an analytical framework may be applied to the dataset to determine how the design features of the first build affect the clock gate timing. Examples of possible analytical frameworks include machine learning such as neural networks and other heuristics. At process 114, the method may measure values of design features for a second clock tree build which may be the subject of modeling for physical synthesis. At process 116, predicted values of clock gate timing for the second build may be generated based on how the design features of the first build affected the clock gate timing of the first build. At process 118, the predicted values of clock gate timing may be used to model the clock tree for the second build. The model using the predicted values of clock gate timing may be used, for example, to drive physical optimization, timing closure, and/or register transfer level (RTL) feedback.

Figure 3:
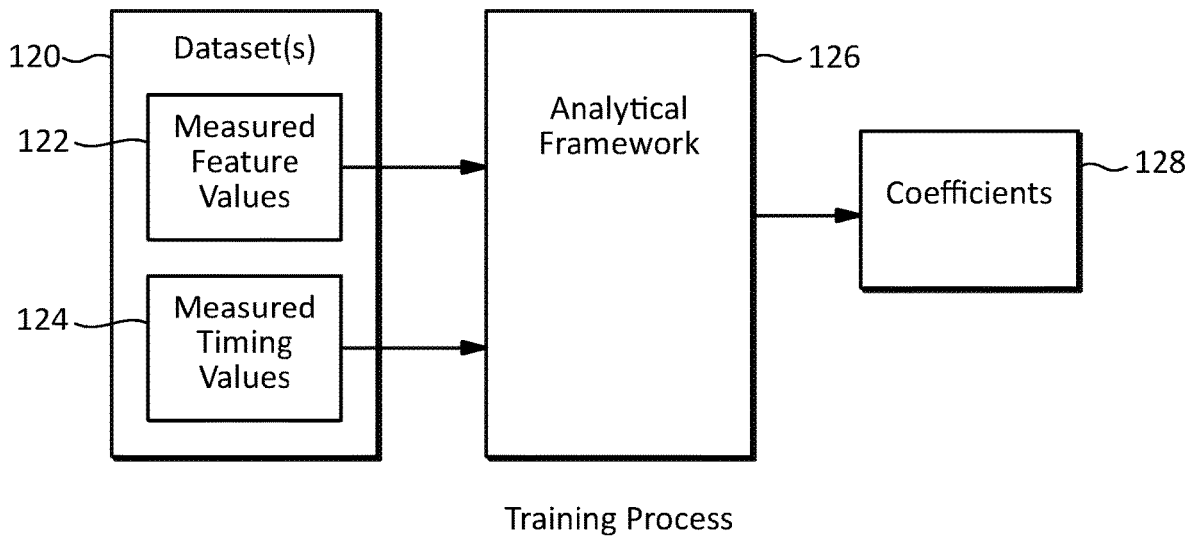
FIG. 3 illustrates an input/output flow for an embodiment of a training process for modeling clock gate timing for an integrated circuit according to the principles of this disclosure.

FIG. 3 illustrates an input/output flow for an embodiment of a training process for modeling clock gate timing for an integrated circuit according to the principles of this disclosure. In the embodiment of FIG. 3, an analytical framework 126 may analyze one or more datasets 120 which may each include measured values 122 of at least two design features and corresponding measured values 124 of clock gate timing such as latency for one or more clock tree builds. Based on this analysis, the analytical framework 126 may generate one or more coefficients 128 that may be applied to measured features of clock gates in the same or other builds to create predictions of the clock gate timing in those builds. The analytical framework 126 may implement any type of process for determining how the design features of the one or more clock tree builds affect the clock gate timing. This may include learning techniques including heuristics such as search trees, problem simplification, and so forth, as well as machine learning techniques such as neural networks (e.g., deep neural networks, convolutional neural networks), decision trees, and so forth.

The analytical framework 126 may be implemented in hardware, software or any suitable combination thereof. For example, the analytical framework 126 may be implemented as part of a tool in an electronic design automation (EDA) platform which may be realized as a dedicated workstation, software as a service (cloud-based), or any combination of configurations. In some implementations, the analytical framework 126 may be implemented as a separate system from an EDA platform using any combination of hardware and/or software to receive, analyze, generate and/or output data to perform any of the functions described in this disclosure. The datasets, coefficients and any other data used or generated by the analytical framework 126 may be handled manually by a user, automatically by integration into an EDA platform, or a combination thereof. They may take any suitable form such as files on any medium including magnetic, solid state, and so forth, as well as data streams through any form of interconnect.

In some implementations, the analytical framework 126 may operate in an iterative manner to progressively refine and/or improve the coefficients and/or the results thereof. The iterations may be based on different datasets which may be provided by a user or automated process to create results that cover a wider range of input values. The iterations may also be based on the same dataset, for example, with refinements to parameters at each iteration to further refine the resulting coefficients for a narrower range of input values.

The coefficients may be generated in a very wide range of forms according to the principles of this disclosure. For example, the coefficients may be implemented as a (one-dimensional) list of mathematical coefficients wherein each coefficient may be multiplied by a corresponding measured value of a clock tree feature with the resulting products either being used as multiple output values or summed to provide a single final value for a later predictive operation. As another example, the coefficients may be implemented as a multi-dimensional matrix of coefficients that may be multiplied by the measured values of a clock tree features in various combinations with intermediate products that may be used as final values or combined through various summing operations to provide one or more final results. The coefficients may also take on other less linear, less mathematical and more qualitative forms that operate in conjunction with, or as alternatives to, other types of coefficients. For example, the coefficients may have some Boolean forms that instruct later predictive operations to ignore certain other inputs or design features in certain circumstances or instruct or suggest a certain combination and/or permutation of features be used in the current or future analysis. Thus, in some embodiments the coefficients may take the form of any information that may be useful to convey what was learned about the relationships between the measured value of design features and the effect they have on the clock gate timing to a process that may use this information to make predictions about clock gate timing.

Figure 4:
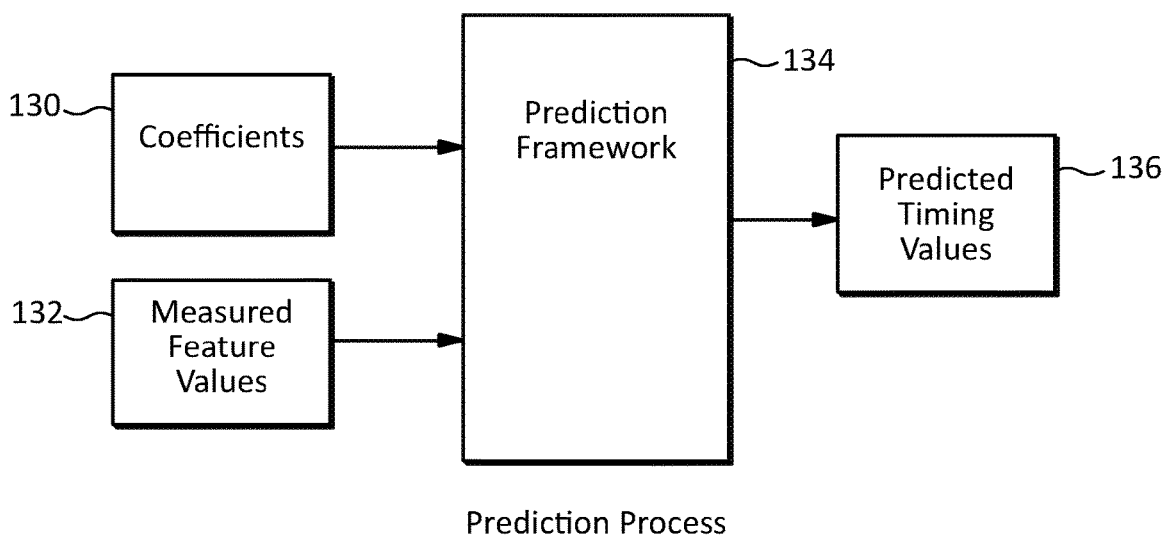
FIG. 4 illustrates an input/output flow for an embodiment of a prediction process for modeling clock gate timing for an integrated circuit according to the principles of this disclosure.

FIG. 4 illustrates an input/output flow for an embodiment of a prediction process for modeling clock gate timing for an integrated circuit according to the principles of this disclosure. In the embodiment of FIG. 4, a prediction framework 134 may apply coefficients 130 to one or more measured values of design features 132 to generate predicted timing values 136 for the clock gates. The coefficients 130 may be the coefficients 128 generated by the analytical framework 126 of FIG. 3, or they may be obtained through any other suitable source. The predicted timing values 136 may be used to model the clock gates at any point in the design flow for the subject clock tree.

The prediction framework 134 may use any suitable formulas, equations, logic, processes, methods, and so forth, to apply the coefficients 130 to the measured values of design features 132. In some implementations, the prediction framework 134 may operate in an iterative manner to progressively refine and/or improve the predicted timing values 136 for the clock gates. The iterations may be based, for example, on different sets of coefficients which may be provided by a user or automated process.

In some embodiments, measured timing values of any physical designs of clock gates resulting from the use of the predicted timing values 136 may be used as input datasets 120 to the training process of FIG. 3 to create different sets of coefficients or to refine and/or improve previously generated sets of coefficients.

As with the embodiment of FIG. 3, the prediction framework 134 of FIG. 4 may be implemented in hardware, software or any suitable combination thereof. The coefficients 130, measured values of design features 132 and any other data used or generated by the prediction framework 134 may take any suitable form such as files on any medium including magnetic, solid state, and so forth, as well as data streams through any form of interconnect.

Figure 5:
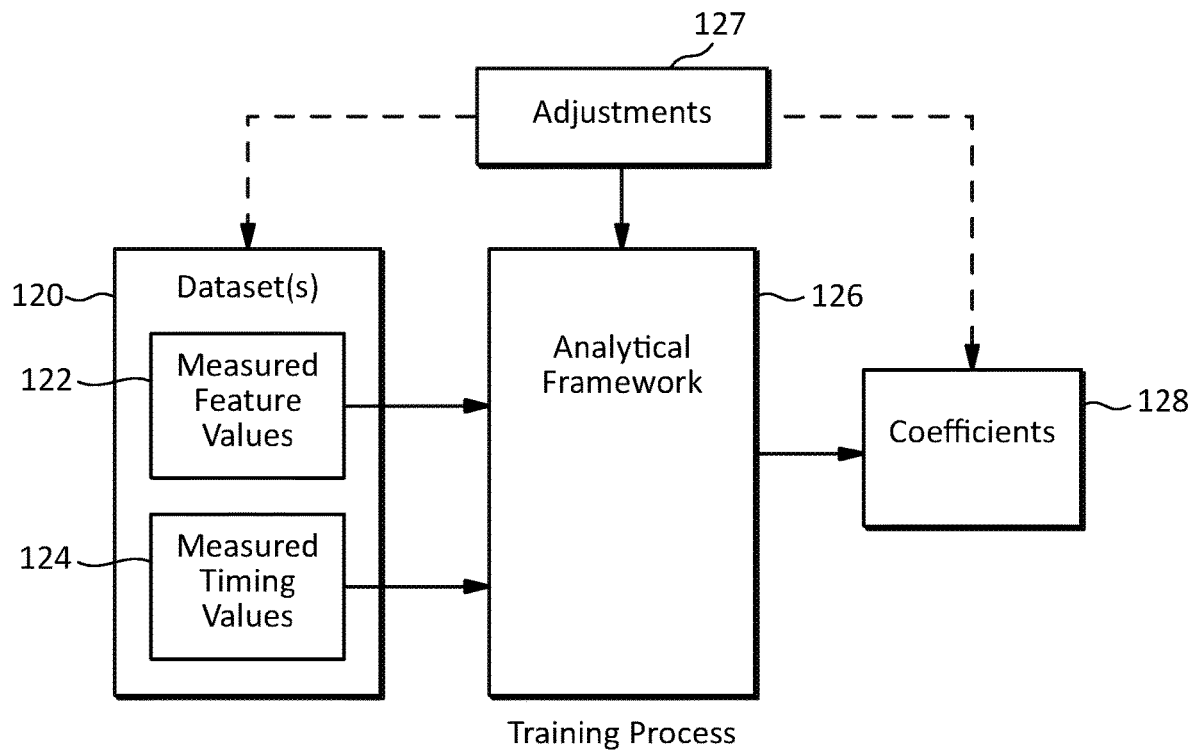
FIG. 5 illustrates an input/output flow for another embodiment of a training process for modeling clock gate timing for an integrated circuit according to the principles of this disclosure.

FIG. 5 illustrates an input/output flow for another embodiment of a training process for modeling clock gate timing for an integrated circuit according to the principles of this disclosure. The embodiment of FIG. 5 may be similar to that of FIG. 3 but with the addition of adjustments 127 which may be applied to or through the analytical framework 126. The adjustments may be based on any factors that may affect the design features and/or the effect the features may have on the generated coefficients. Examples include: the process technology that may be used to fabricate any of the clock gates; standard cell libraries that may be used for the clock gates (for example, different clock buffer designs may be faster or slower than others), placement and/or routing details (for example, the electrical and/or physical characteristics of metal traces); the timing or other tools (for example, compilers, static timing analyzers, and the like) that may be used to design the clock trees in the training builds and/or the subject builds; the methodology used to build and/or analyze the clock trees (for example, clock tre synthesis (CTS), multi-source CTS (MSCTS), clock mesh, and the like); constraints (for example, any buffer may drive up to four other buffers); the number of clock sources for a multi-source clock tree; and any other factors that may affect the design features and/or their timing. Another example of an adjustment includes selecting a permutation and/or combination of design features to use as inputs, for analysis, and/or coefficients.

Alternatively, or in addition to applying the adjustments 127 through the analytical framework 126, any or all of the adjustments 127 may be applied directly to the datasets 120 including the measured values 122 of at least two design features and corresponding measured values 124 of clock gate timing. The adjustments 127 may also be applied directly to the coefficients 128. The adjustments 127 may be handled manually by a user, automatically by integration into an EDA platform, or a combination thereof. They may take any suitable form such as files on any medium including magnetic, solid state, and so forth, as well as data streams through any form of interconnect.

Figure 6:
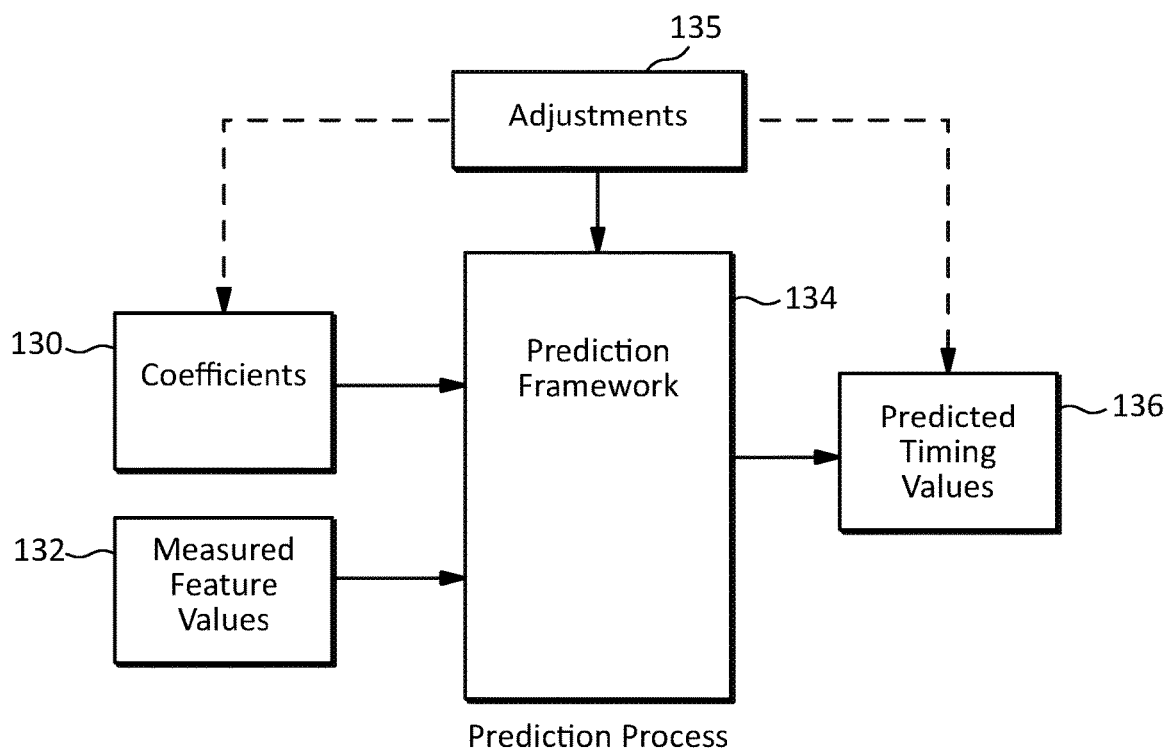
FIG. 6 illustrates an input/output flow for another embodiment of a prediction process for modeling clock gate timing for an integrated circuit according to the principles of this disclosure.

FIG. 6 illustrates an input/output flow for another embodiment of a prediction process for modeling clock gate timing for an integrated circuit according to the principles of this disclosure. The embodiment of FIG. 6 may be similar to that of FIG. 4 but with the addition of adjustments 135 which may be applied to or through the prediction framework 134 and/or directly to the coefficients 130, or predicted clock gate timing 136. The adjustments 135 may be based on any factors that may affect the design features and/or the effect the features may have on the generated coefficients, and may include any of the examples described above with respect to the training process of FIG. 5. Likewise, the adjustments 135 may be handled manually by a user, automatically by integration into an EDA platform, or a combination thereof. They may take any suitable form such as files on any medium including magnetic, solid state, and so forth, as well as data streams through any form of interconnect.

Figure 7:
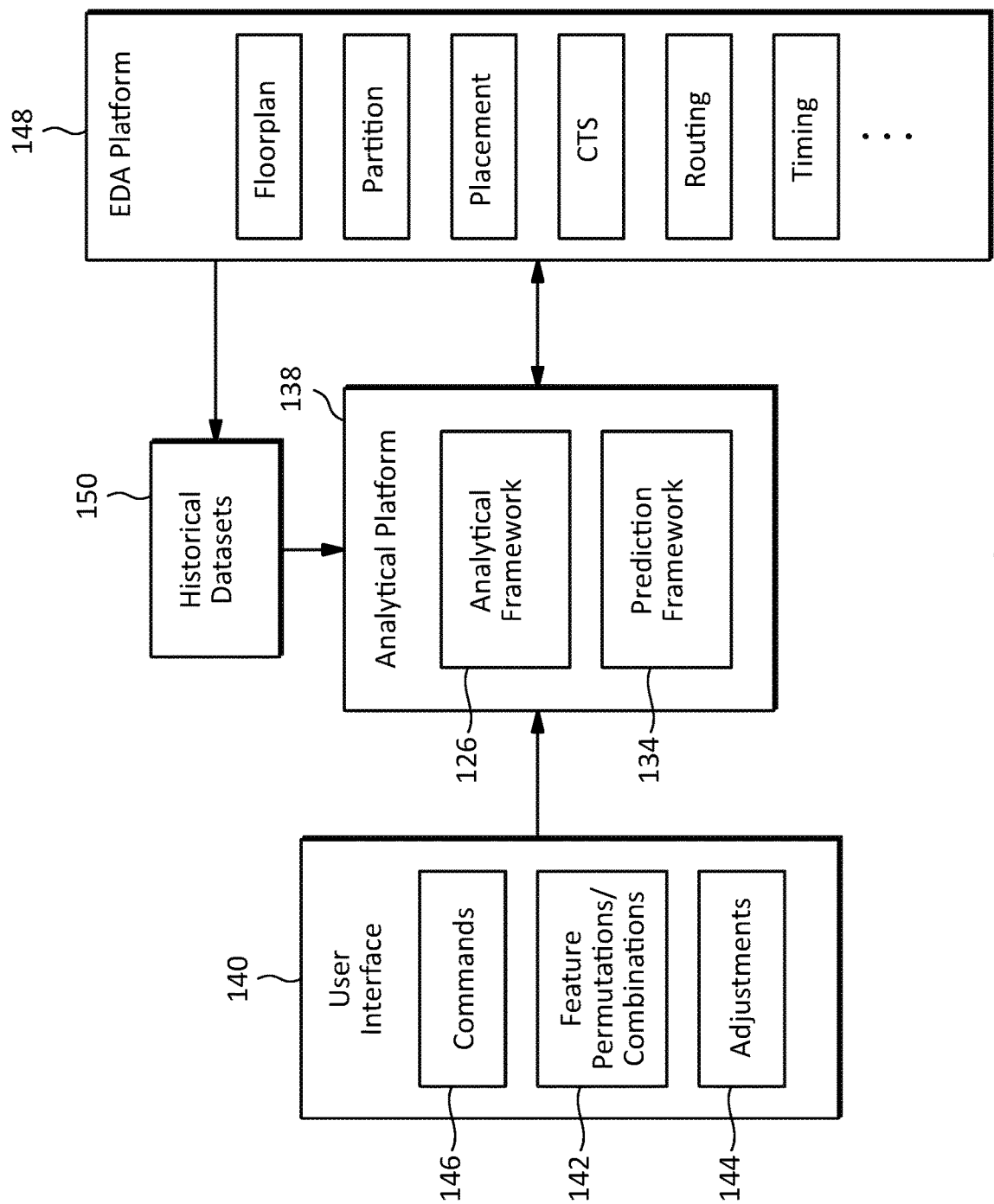
FIG. 7 is a block diagram of an embodiment of a system for modeling clock gate timing for an integrated circuit according to the principles of this disclosure.

FIG. 7 is a block diagram of an embodiment of a system for modeling clock gate timing for an integrated circuit according to the principles of this disclosure. The system of FIG. 7 may be used, for example, to implement any or all of the methods described in this disclosure.

The system of FIG. 7 includes an analytical platform 138 which may be used to implement the analytical framework 126 and the predictive framework 134. A user interface 140 enables a clock designer to input commands 146, for example, in batch mode, interactive mode, or a combination thereof. The user interface 140 also enables the designer to select permutations and/or combinations of features 142 to use for the training and/or prediction process, and to enter and/or modify any of the adjustment factors 144 described above. For example, different permutations and combinations of design features may be used for different builds. The analytical platform 138 may use historical datasets 150, which may be provided by an EDA platform as described below, as inputs to generate coefficients. In addition, or alternatively, datasets 150 may be provided by a user in any suitable form. Either or both of the user analytical platform 138 and user interface 140 may be implemented in hardware, software or any suitable combination thereof.

The embodiment of FIG. 7 is illustrated in conjunction with an EDA platform 148 on which any or all of the components and/or workflow may be implemented, but the principles of this disclosure are not limited to implementation on any particular platform. The EDA platform 138 may include integrated circuit design tools that may perform conventional functions for physical design including floor-planning, partitioning, placement, clock tree synthesis, routing, timing analysis, etc. In some implementations, some or all of the analytical 138 and or the input/output flow shown in FIG. 7 may be performed separately from the EDA platform 148. In other implementations, some or all of the analytical platform 140 and or the input/output flow of FIG. 7, as well as some or all of the methods, workflows, processes, and the like described in this disclosure may be integrated into one or more tools of the EDA platform 148 or any other suitable design platform and/or tools.

Figure 8:
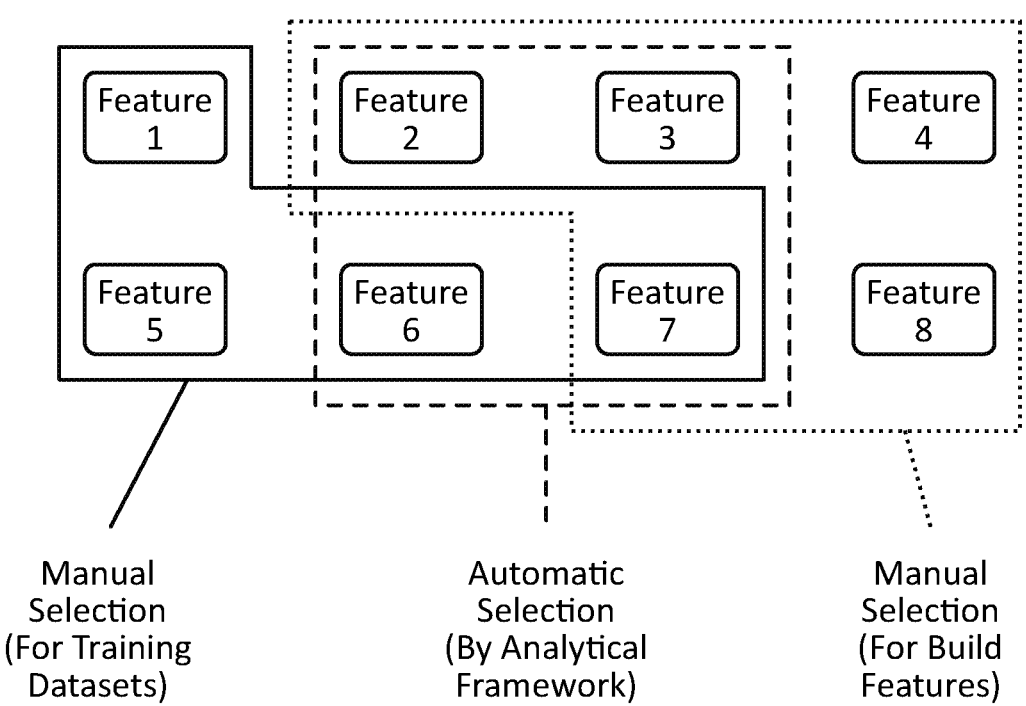
FIG. 8 illustrates how various permutations and combinations of design features may be selected for use in any of the methods and processes according to the principles of this disclosure.

FIG. 8 illustrates how various permutations and combinations of design features may be selected for use in any of the methods and processes according to the principles of this disclosure. Permutations and combinations of features may be selected manually by a user for use in training datasets to generate coefficients during one or more training processes. Permutations and combinations of design features may also be selected manually by a user for use when building new clock trees. The permutations and combinations of design features used during training need not necessarily be the same as the permutations and combinations used during a subsequent build that uses the learned coefficients for modeling. Permutations and combinations of design features may also be selected automatically, for example, by one or more processes in the analytical platform 138, based on an internal analysis of the results, feedback from a user about results, input from a user relating to features that may be more or less important for various builds, and the like.

Figure 9:
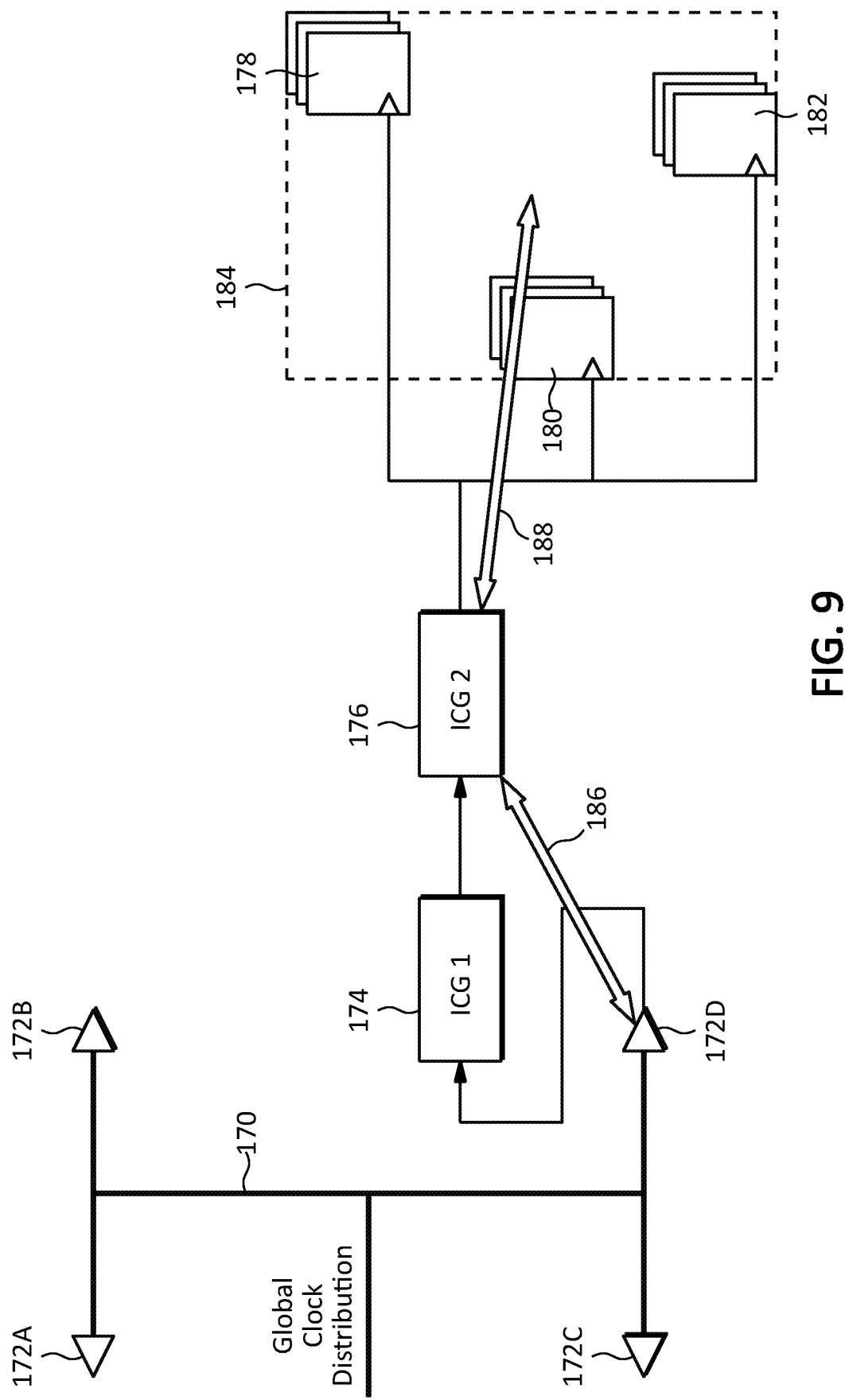
FIG. 9 illustrates an example embodiment of a portion of a clock tree illustrating example design features that may be measured for use in a training process according to the principles of this disclosure.

FIG. 9 illustrates an example embodiment of a portion of a clock tree illustrating example design features that may be measured for use in a training process according to the principles of this disclosure. A clock distribution network 170, which in this example uses an H-tree topology, distributes a clock signal from a clock source to endpoints 172A. 172B, 172C and 172D. The endpoints of the clock distribution network 170 are used as local clock sources or tap points for local clock trees that distribute the clock signal to points of usage at the device level of an integrated circuit chip. FIG. 9 illustrates a portion of a local clock tree including a first clock gate 174, a second clock gate 176 arranged downstream of the first clock gate 174, three registers 178, 180 and 182 (each having three flip-flops), all of which may be down stream of, and fan out from, the second clock gate 176. A bounding box 184 illustrates an area that may be occupied by all of the clock sinks, including the three groups of registers 178, 180 and 182, for which clocking is controlled by the second clock gate 176.

The portion of the local clock tree illustrated in FIG. 9 may include other components such as buffers and/or inverters in the signal paths, for example there may be strings of buffers between the local clock source 172D and the first clock gate 174, between the first clock gate 174 and the second clock gate 176, and between the second clock gate 176 and the three registers 178, 180 and 182, as well as any other gated synchronized circuit elements within the bounding box 184. These additional components, however, are not illustrated to prevent the drawing from becoming obscured by details.

In this example embodiment, the following features of the second clock gate 176 may be measured for purposes of determining their effect on the timing of the second clock gate:

(1) The logical level of the clock gate. In this example the logic level is two because there is one level of logic (clock gate 174) between the local clock source 172D and the clock gate 176.

(2) The transitive fan-out of the clock gate. The transitive fan-out may typically include the total number of all clocked (synchronized) circuit elements that receive a clock signal that is controlled, directly or indirectly through other levels of logic, the clock gate 176. In this example, the fanout may be shown as nine (three flip-flops in each of the three registers 178, 180 and 182).

(3) The area of bounding box 184 enclosing the fan-out cone of the clock gate. This may be a measure of the integrated circuit chip area occupied by all clocked (synchronized) circuit elements that receive a clock signal that is controlled, directly or indirectly through other levels of logic, by the clock gate 176.

(4) The distance from the local clock source 172D to the clock gate 176. Although shown as a straight direct line by arrow 186 in FIG. 9, in some implementations this may be realized as the Manhattan distance between the local clock source 172D to the clock gate 176. The Manhattan distance may be the distance between two points measure along a path having straight segments aligned at right angles to each other because wiring in integrated circuits tends to be laid out along such right angle paths. Alternatively, the Euclidean distance or any other distance may be used.

(5) The distance from the local clock source to a midpoint of the bounding box enclosing the fan-out cone of the clock gate, as shown by arrow 188. This distance is also shown as a straight direct line in FIG. 9, but in some implementations, this may be realized as the Manhattan distance between the local clock source 172D and the midpoint of the bounding box 184. Alternatively, the Euclidean distance or any other distance may be used.

FIG. 10 illustrates a dataset showing example values of measured design features and corresponding measured values of clock gate latencies according to this disclosure. Each row of the table may provide example values for one clock gate as indicated in the column on the left. The example values shown in FIG. 10 are only intended for purposes of illustration and may not represent actual values measured in any physical or simulated clock tree. By way of example, Feature 1 may be transitive fan-out, Feature 2 may be bounding box area. Feature 3 may be logic level. Feature 4 may be the Manhattan distance from the local clock source to the gate, and Feature 5 may be the Manhattan distance from the gate to the midpoint of the bounding box. Alternatively, the Euclidean distance or any other distance may be used. Units of distance and area may be, for example, nanometers (nm) and square nanometers ($nm^2$), and units of time may be, for example picoseconds (ps), but the principles of this disclosure are not limited to any such units or example values.

Figure 11:
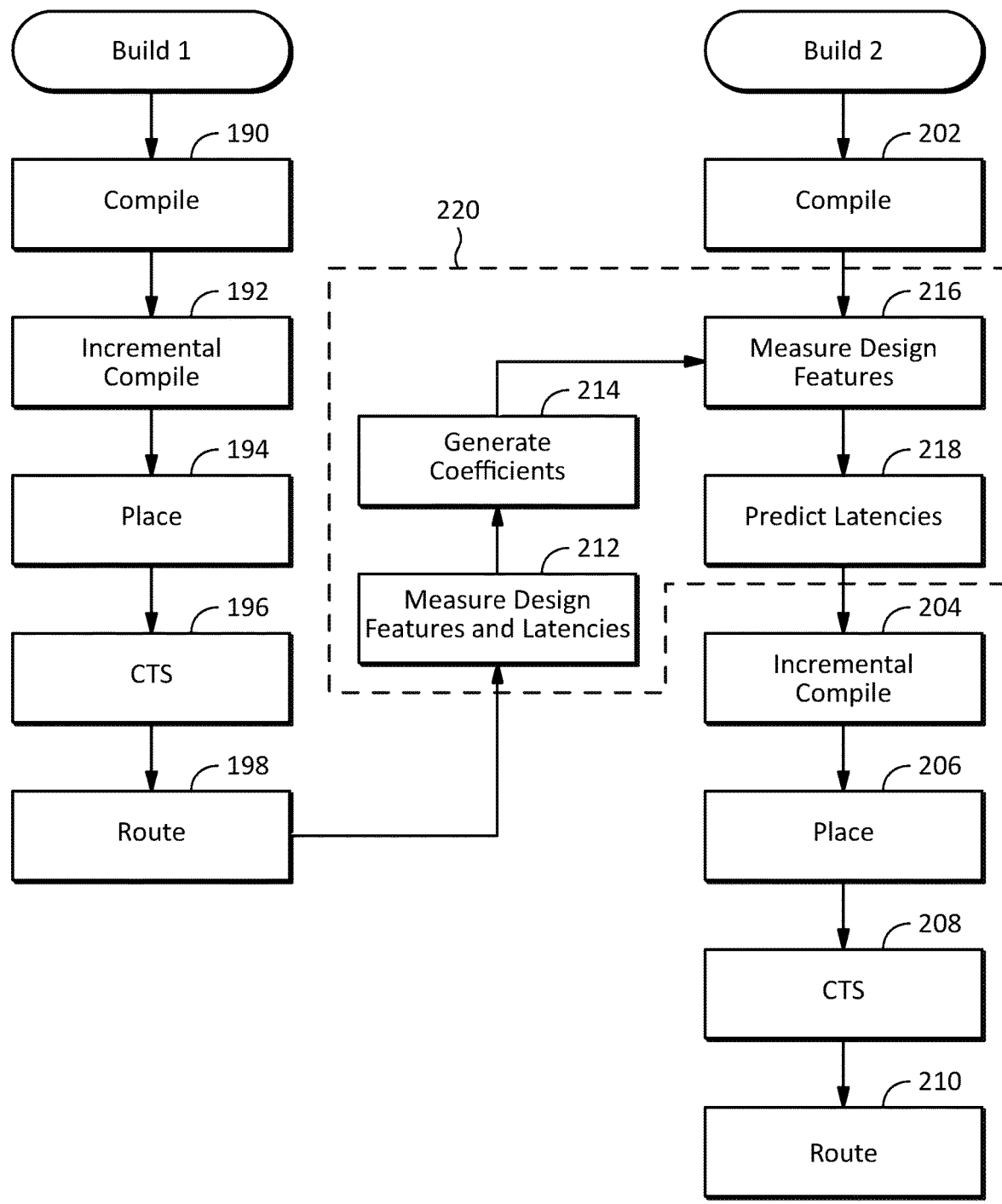
FIG. 11 is a flow chart of a more detailed example embodiment of a workflow for modeling clock gate timing for an integrated circuit according to the principles of this disclosure.

FIG. 11 is a flow chart of a more detailed example embodiment of a workflow for modeling clock gate timing for an integrated circuit according to the principles of this disclosure. The first build process on the left side of FIG. 11 may be referred to as a training build, while the second build on the right side may be referred to as a modeling build. The training build may include conventional processes for physical design (synthesis) of a gated clock tree. A silicon compiling process 190 may translate a logical circuit design to physical layout including a floorplan with groups of logic functions and clock trees. An incremental compiling process 192 may enable a designer to modify portions of the design without having to re-synthesize the entire design. During a placement process 194, macros, standard cells and other circuit elements may be placed at location within blocks and other partitions of the integrated circuit floorplan. During a local clock construction process 196, local clock trees may be constructed to distribute clock signals from the endpoints of a global or higher level clock distribution network (which serve as clock sources for local clock trees) to points of usage at the device level of an integrated circuit. Local clock trees may be constructed using, for example, clock tree synthesis (CTS) which is a common process for building and balancing a local clock tree to minimize latency and skew of local clock signals. At process 198, all remaining connections may be completed by routing conductive traces between physical terminals of device-level components.

Alternatively, or in parallel, the method may diverge from the conventional workflow at process 212, and one or more datasets may be generated by measuring various features and corresponding timing of clock gates in the training build. In this example embodiments, the timing may be latency, but other timing values may be used. The measurements may be collected for any number of clock gates depending on the implementation details. For example, in some situations, it may be beneficial to take measurements for every clock gate to provide a large dataset which may result in more accurate training. In other situations, it may be beneficial to collect measurements for only strategically selected gates that have been chosen to provide a representative sample of different clock gates while reducing the size of the dataset to reduce the amount of computation or other processing that may be required to generate coefficients.

At process 214, an analytical framework may be applied to the one or more datasets to determine how the design features affect the clock gate timing based on the first build. As described above, the analytical framework is not limited to any particular training or learning process and may include the use of machine learning techniques such as neural networks and/or other heuristics. In this example embodiment, the analytical framework may be implemented as a deep neural network that may be configured to train on the one or more datasets and calculate linear coefficients for each feature based on hyper-parameters that may be modified by a user between iterations of training.

Having generated coefficients in process 214, the method of FIG. 11 may now intercept the otherwise conventional second build to use the coefficients for modeling clock gates in the second build. The second build may include a compile process 202, an incremental compile process 204, a placement process 206, a local clock synthesis process 208, and a routing process 201 that may be similar to the corresponding processes in the first build.

The coefficients and resulting modeling may be used at any point in the second build, although it may be more beneficial to use them at any point before the local clock tree synthesis process 208. It may be especially beneficial to use the predicted clock gate timing between the compile process 202 and the incremental compile process 204 because, with benefit of the predicted clock gate timing, a designer may make changes to only the relevant portions of the design in the incremental compile process 204. Therefore, FIG. 11 shows processes 216 and 218 inserted between the second build compile process 202 and the incremental compile process 204 of the second build, but these processes may be inserted between, or combined with, other processes in the second build.

At process 216, features of any or all of the clock gates in the second build may be measured. Any features including any of those described in this disclosure may be measured for each gate. Moreover, a designer may select any permutation or combination of features on which to apply the coefficients to generate predicted values of clock gate timing, which in this example embodiment may be clock gate latency.

At process 218, coefficients generated in process 214 may be applied to the values of design features measured in process 216 to generate predicted latency values of the clock gates in the second build. These predicted latency values may be applied dynamically (on-the-fly) during the second build, which may then continue with the incremental compile process 204 using the predicted timing values of the clock gates.

Figure 12:
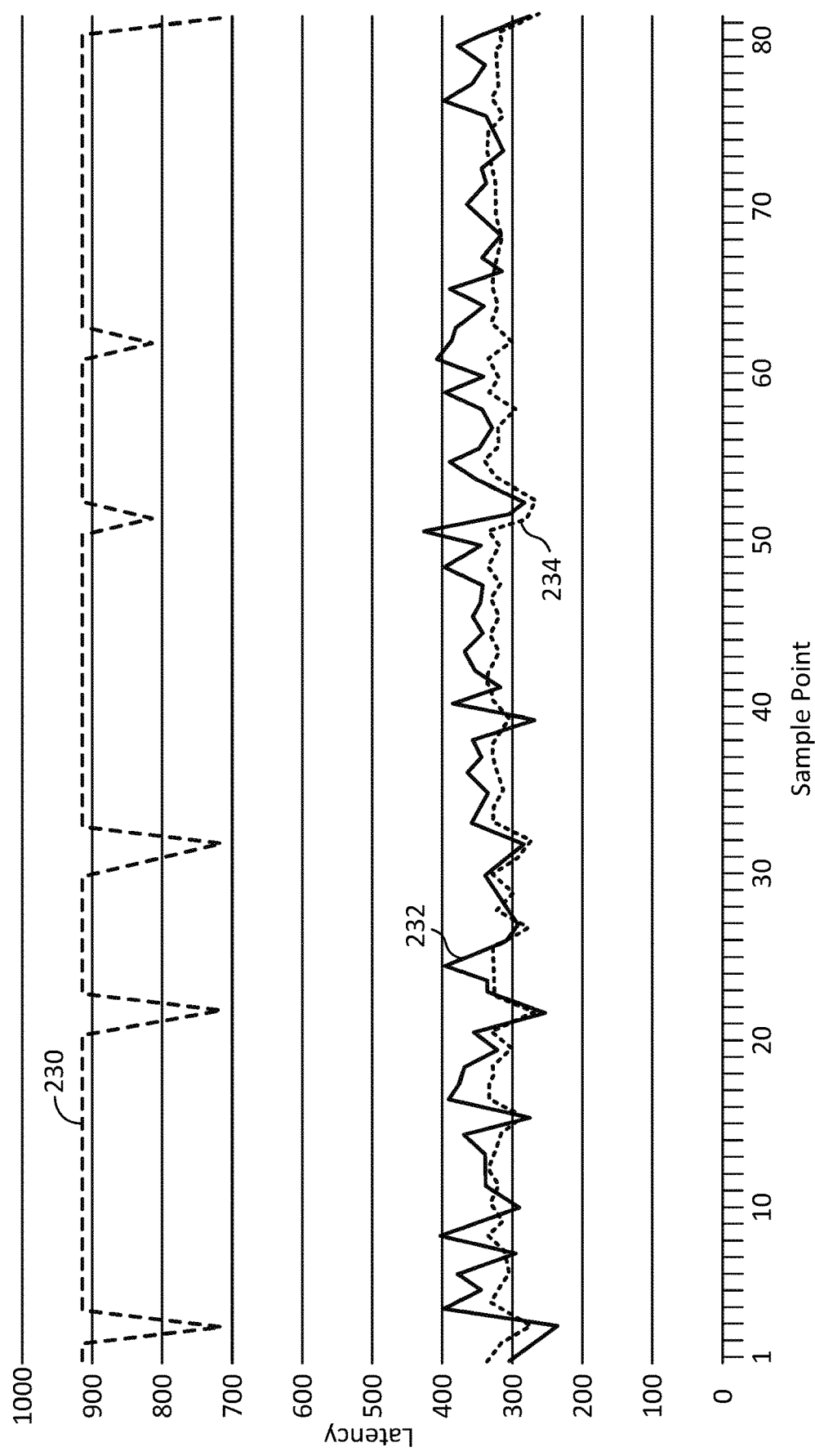
FIG. 12 illustrates examples of relative results that may be obtained by conventional techniques and by one or more techniques according to this disclosure.

FIG. 12 illustrates examples of relative results that may be obtained by conventional techniques and by one or more techniques according to this disclosure. In the chart of FIG. 12, the dashed trace 230 shows latency values (in ps) that may have been used for various gates, indicated along the bottom axis, using the conventional method of estimating clock gate latency based on bracketed values of transitive fan-out. The solid trace 232 shows the actual latency values measured for the same gates, while the dotted trace 234 shows the latency values calculated using a single iteration of the deep neural network described above. The values shown in FIGS. 12 and 13 are for purposes of illustration and may not represent actual values from a physical or simulated implementation.

Figure 13:
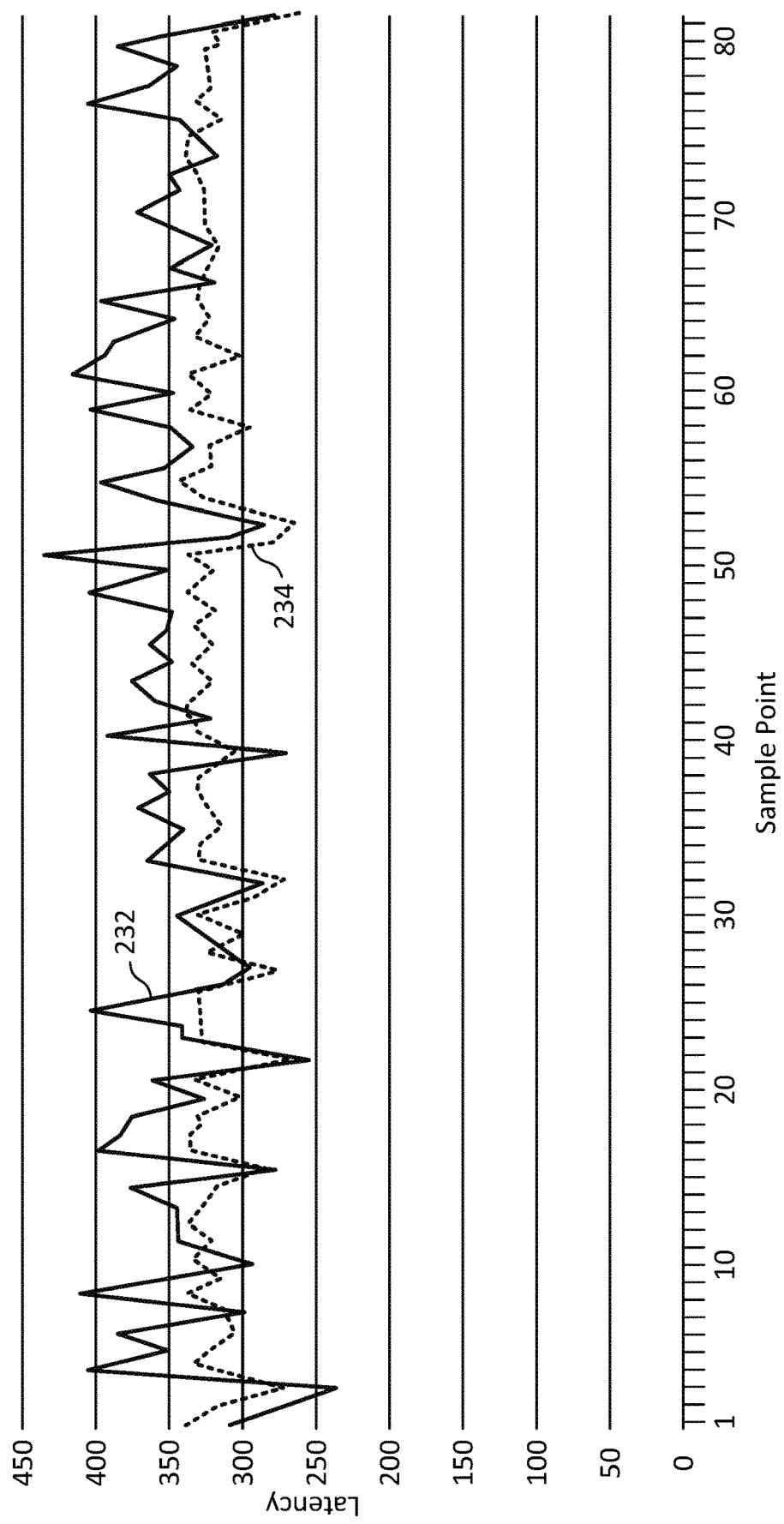
FIGS. 13 and 14 illustrate examples of relative results that may be obtained using multiple iterations of the deep neural network according to this disclosure.
Figure 14:
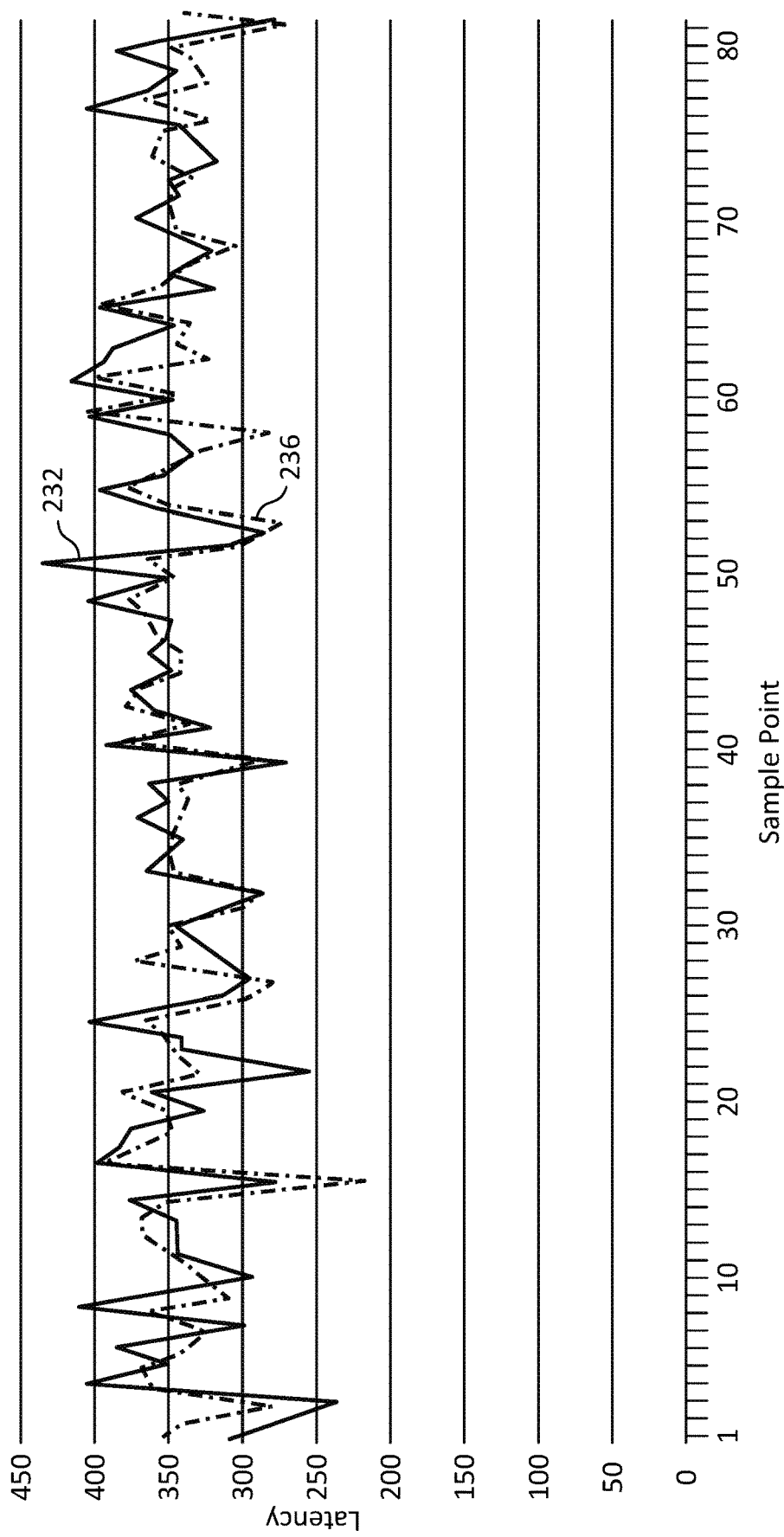

FIGS. 13 and 14 illustrate examples of relative results that may be obtained using multiple iterations of the deep neural network mentioned above with respect to FIG. 12. The traces 232 and 234 in FIG. 13 may be essentially the same as those in FIG. 12 but shown on a different vertical scale to amplify the differences. The solid trace 232 shows the actual latency values measured for the gates indicated along the bottom, while the dotted trace 234 shows the latency values calculated using a single iteration of the deep neural network. Referring to FIG. 14, the solid trace 232 again shows actual the latency values, while the dashed-dotted trace 236 shows the latency values calculated after a second iteration the deep neural network.

At many of the points in the method of FIG. 11, adjustment factors may be applied. For example, any adjustment factors, including those described in this disclosure, may be applied to the process and/or the measured values of the design features and/or timing of the first build at process 212, to the process and/or the coefficients generated at the process 214, to the measured values of the design features at process 216, and/or to the process and/or the predicted clock gate timing at process 218. The adjustments may be applied manually by a designer or other user, automatically, for example by the analytical framework 126 and/or the prediction framework 134 or any combination thereof.

At many of the points in the method of FIG. 11, a subset of the features may be chosen to use for faster and simpler coefficient calculations, latency prediction, and the like. The subset may be chosen manually by a designer or other user, automatically, for example by the analytical platform 138 of FIG. 7, or any combination thereof.

Thus, depending on the embodiment and implementation details, the principles of this disclosure may provide an efficient and accurate method for predicting clock gate timing that may drive physical optimization, timing closure, register transfer level (RTL) feedback, and/or other aspects of physical synthesis for clock gates. For example, the portions of the method of FIG. 11 enclosed within the dashed lines 220 may be integrated into the otherwise conventional workflow of the second build to improve results with little if any disruption of the workflow. Moreover, since the principles of this disclosure may provide a solution that may be implemented relatively early in the design workflow, it may cause little or no delay in the process of converging clock gate enable timing.

Depending on the embodiment and implementation details, the method of FIG. 11 may implement a learning process that trains on post-CTS data from one or more training builds to generate coefficients to predict clock gate latency pre-CTS for other builds with arbitrary designs. The process may be implemented dynamically and/or iteratively. For example, the first build may be set up to keep running by itself to progressively generate more training datasets that may be used to keep refining and/or improving the coefficients generated by the analytical framework. Moreover, the principles of this disclosure may be used to predict the latency or other timing of clock gates by measuring electrical or physical features of clock gates that may be more pertinent to creating datasets using historical data of the same physical block.

Figure 15:
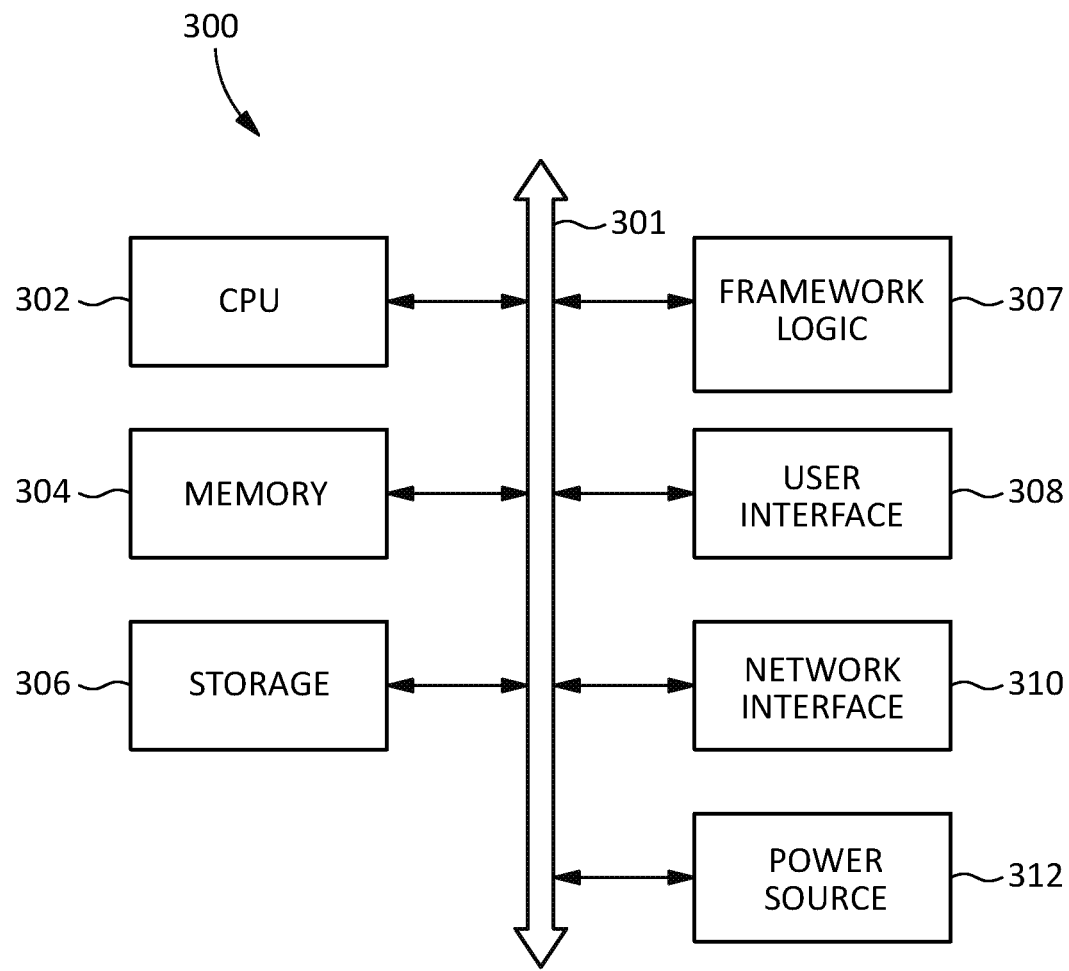
FIG. 15 illustrates an embodiment of a computing system according to this disclosure.

FIG. 15 illustrates an embodiment of a computing system according to this disclosure. The system 300 of FIG. 15 may be used to implement any or all of the methods and/or apparatus described in this disclosure. The system 300 may include a central processing unit (CPU) 302, memory 304, storage 306, user interface 308, network interface 310, and power source 312. Framework logic 307 may include logic to implement any of the measurements, datasets, coefficients, values, adjustments, analytical frameworks, prediction frameworks, predicted timing values and other features described in this disclosure. In different embodiments, the system may omit any of these components or may include duplicates, or any additional numbers of, any of the components, as well as any other types of components to implement any of the methods and/or apparatus described in this disclosure.

The CPU 302 may include any number of cores, caches, bus and/or interconnect interfaces and/or controllers. The Memory 304 may include any arrangement of dynamic and/or static RAM, nonvolatile memory (e.g., flash memory) etc. The storage 306 may include hard disk drives (HDDs), solid state drives (SSDs), and/or any other type of data storage devices or any combination thereof. The user interface 308 may include any type of human interface devices such as keyboards, mice, monitors, video capture or transmission devices, microphones, speakers touchscreens, etc. as well as any virtualized or remote versions of such devices. The network interface 310 may include one or more adapters or other apparatus to communicate through Ethernet. Wi-Fi. Bluetooth, or any other computer networking arrangement to enable the components to communicate through physical and/or logical networks, such as an intranet, the Internet, local area networks, wide area networks, etc. The power source 312 may include a battery and/or a power supply capable of receiving power from an AC or DC power source and converting it to any form suitable for use by the components of system 300.

Any or all of the components of the system 300 may be interconnected through a system bus 301 which may collectively refer to various interfaces including power buses, address and data buses, high-speed interconnects such as Serial AT Attachment (SATA), Peripheral Component Interconnect (PCI), Peripheral Component Interconnect Express (PCI-e), System Management Bus (SMB), and any other types of interfaces that may enable the components to work together, either locally at one location, and/or distributed between different locations.

The system 300 may also include various chipsets, interfaces, adapters, glue logic, embedded controllers, such as programmable or non-programmable logic devices or arrays, application specific integrated circuits (ASICs), embedded computers, smart cards, and the like, arranged to enable the various components of the system 300 to work together to implement any of the all of the methods and/or apparatus described in this disclosure. Any of the components of the system 300 may be implemented with hardware, software, firmware, or any combination thereof. In some embodiments, any or all of the components may be realized in a virtualized form and/or in a cloud-based implementation with flexible provisioning of resources, for example within a data center, or distributed throughout multiple data centers.

The blocks or steps of a method or algorithm and functions described in connection with the embodiments disclosed herein may be embodied directly in hardware, in a software module executed by a processor, or in a combination of the two, including in the system 300. If implemented in software, the functions may be stored on or transmitted over as one or more instructions or code on a tangible, non-transitory computer-readable medium. A software module may reside in Random Access Memory (RAM), flash memory. Read Only Memory (ROM). Electrically Programmable ROM (EPROM), Electrically Erasable Programmable ROM (EEPROM), registers, hard disk, a removable disk, a CD ROM, or any other form of storage medium.

The use of terms such as "first" and "second" in this disclosure and the claims may only be for purposes of distinguishing the things they modify and may not to indicate any spatial or temporal order unless apparent otherwise from context. The various details and embodiments described above may be combined to produce additional embodiments according to the inventive principles of this patent disclosure. Since the inventive principles of this patent disclosure may be modified in arrangement and detail without departing from the inventive concepts, such changes and modifications are considered to fall within the scope of the following claims.

The invention claimed is:

1. A method for modeling clock gate timing for an integrated circuit, the method comprising:
   creating a dataset having measured values of at least two design features and corresponding measured values of clock gate timing;
   applying an analytical framework to the dataset to determine coefficients based on the design features and measured values of clock gate timing;
   measuring values of design features for a clock tree for the integrated circuit;
   generating predicted values of clock gate timing for the clock tree for the integrated circuit based on the coefficients, wherein the predicted values of clock gate timing correspond to the measured values of the design features for the clock tree;
   applying the predicted values of clock gate timing to a model of the clock tree for the integrated circuit; and
   performing a synthesis of the clock tree for the integrated circuit based on the predicted values.

2. A method for modeling clock gate timing for an integrated circuit, the method comprising:
   creating a dataset having measured values of at least two design features and corresponding measured values of clock gate timing;
   applying an analytical framework to the dataset to determine coefficients based on the design features and measured values of clock gate timing;
   measuring values of design features for a clock tree for the integrated circuit; and
   generating predicted values of clock gate timing for the clock tree for the integrated circuit based on the coefficients;
   wherein:
   the clock tree for the integrated circuit is a second clock tree and part of a second build; and creating the dataset comprises:
  constructing a first clock tree as part of a first build,
  measuring values of design features of the first clock tree, and
  measuring corresponding values of clock gate timing of the first clock tree.

3. The method of claim 2 wherein the values of the design features and clock gate timing are measured after a physical synthesis of the first clock tree.

4. The method of claim 2, further comprising applying the predicted values of clock gate timing to a model of the second clock tree.

5. The method of claim 4, wherein the predicted values of clock gate timing are applied to the model of the second clock tree before a physical synthesis of the second clock tree.

6. The method of claim 1, wherein the coefficients are determined for individual design features.

7. The method of claim 6, wherein the coefficients are determined for combinations of design features.

8. The method of claim 7, wherein different combinations of design features are used for different builds.

9. The method of claim 7, wherein coefficients are determined for different permutations of the combinations of features.

10. The method of claim 9, wherein different permutations of design features are used for different builds.

11. The method of claim 1, wherein the analytical framework comprises machine learning.

12. The method of claim 11, wherein the machine learning uses a neural network that is trained on the dataset.

13. The method of claim 1, wherein the values of clock gate timing comprise latency values.

14. The method of claim 1, wherein the clock tree for the integrated circuit comprises clock gate enable paths.

15. The method of claim 1, further comprising applying one or more adjustments to the analytical framework.

16. A method for clock gate modeling for an integrated circuit, the method comprising:
  constructing a first clock tree as part of a first build;
  generating a first dataset by measuring values of design features of the first clock tree, and measuring corresponding values of clock gate timing of the clock gates of the first clock tree;
  applying an analytical framework to the dataset to generate coefficients based on the measured values of the design features of the first clock tree and measured corresponding values of clock gate timing of the first clock tree;
  measuring values of design features for a clock tree for the integrated circuit; and
  generating predicted values of clock gate timing for the clock tree for the integrated circuit based on the coefficients and measured values of one or more corresponding design features used to generate the coefficients.

17. The method of claim 16, further comprising iteratively applying the analytical framework to the first dataset to generate the coefficients.

18. A system for modeling clock gate timing for an integrated circuit, the system comprising:
  an analytical platform configured to:
    apply an analytical framework to a dataset having measured values of at least two design features and corresponding measured values of clock gate timing for a first clock tree build, wherein the analytical framework generates coefficients based on the design features and measured values of the clock gate timing; and
    generate predicted values of clock gate timing for a second clock tree build based on the coefficients and measured values of one or more of the corresponding design features used to generate the coefficients.

* * * * *